(12) United States Patent
Kim

(10) Patent No.: US 12,307,127 B2
(45) Date of Patent: May 20, 2025

(54) STORAGE DEVICE AND HOST DEVICE FOR OPTIMIZING MODEL FOR CALCULATING DELAY TIME OF THE STORAGE DEVICE

(71) Applicant: SK hynix Inc., Icheon-si (KR)

(72) Inventor: Ki Tae Kim, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 0 days.

(21) Appl. No.: 18/418,065

(22) Filed: Jan. 19, 2024

(65) Prior Publication Data

US 2024/0160382 A1    May 16, 2024

Related U.S. Application Data

(62) Division of application No. 17/670,275, filed on Feb. 11, 2022, now Pat. No. 11,893,274.

(30) Foreign Application Priority Data

Aug. 10, 2021    (KR) .................. 10-2021-0105625

(51) Int. Cl.
    *G06F 3/06*    (2006.01)
(52) U.S. Cl.
    CPC .......... *G06F 3/0656* (2013.01); *G06F 3/0604* (2013.01); *G06F 3/0679* (2013.01)
(58) Field of Classification Search
    CPC ..... G06F 3/0656; G06F 3/0604; G06F 3/0679

USPC .................................................. 711/154, 118
See application file for complete search history.

(56) References Cited

U.S. PATENT DOCUMENTS

| | | |
|---|---|---|
| 10,282,107 B1 | 5/2019 | Martin |
| 10,482,060 B2 | 11/2019 | The et al. |
| 2012/0047319 A1 | 2/2012 | Yoon |
| 2019/0087332 A1* | 3/2019 | Jun ................... G06F 3/0611 |
| 2020/0050400 A1* | 2/2020 | Kim ................... G06F 3/0659 |
| 2020/0089431 A1 | 3/2020 | Jung |
| 2020/0135283 A1 | 4/2020 | Park |
| 2020/0167095 A1* | 5/2020 | Jung ................... G06F 3/0604 |
| 2020/0192805 A1* | 6/2020 | Keymolen ........... G06F 3/0647 |
| 2020/0285416 A1 | 9/2020 | Wu |
| 2021/0117099 A1 | 4/2021 | Faibish |
| 2023/0050572 A1 | 2/2023 | Kim |

FOREIGN PATENT DOCUMENTS

| | | |
|---|---|---|
| KR | 20190114312 A | 10/2019 |
| KR | 102153924 B1 | 9/2020 |

* cited by examiner

*Primary Examiner* — Than Nguyen
(74) *Attorney, Agent, or Firm* — Perkins Coie LLP

(57) ABSTRACT

A storage device according to the present technology may include a memory device for storing data, a buffer memory configured to temporarily store data to be stored in the memory device, and a memory controller configured to determine a delay time based on a plurality of parameters upon receipt of a write request from a host, and transmit a data request to the host after the delay time has elapsed.

6 Claims, 10 Drawing Sheets delay = f (buffer_usage, elapsed_time)
= a1 x buffer_usage (if buffer_usage<n1) + a2 x buffer_usage (if n1≤buffer_usage)
+ a3 x elapsed_time (if elapsed_time<m1) + a4 x elapsed_time (if m1≤elapsed_time<m2)
+ a5 x elapsed_time (if m2≤elapsed_time) + b1

FIG. 10
|    | a1  | a2  | a3  | a4  | a5  | b1  |
|----|-----|-----|-----|-----|-----|-----|
| x1 | a11 | a21 | a31 | a41 | a51 | b11 |
| x2 | a12 | a22 | a32 | a42 | a52 | b12 |
| x3 | a13 | a23 | a33 | a43 | a53 | b13 |
| ... | ... | ... | ... | ... | ... | ... |
(1)
|    | f1  | f2  |
|----|-----|-----|
| x1 | f11 | f21 |
| x2 | f12 | f22 |
| x3 | f13 | f23 |
| ... | ... | ... |
(2)
FIG. 11
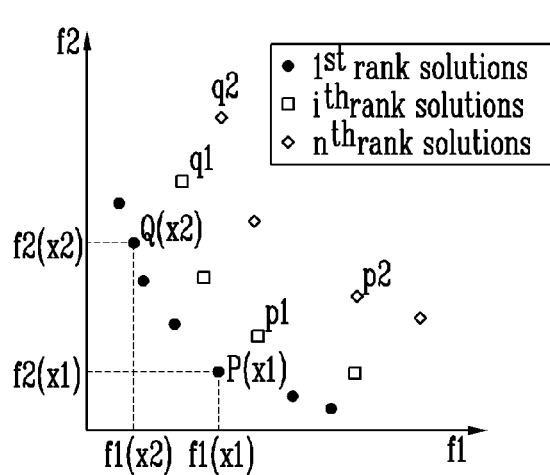
(1)
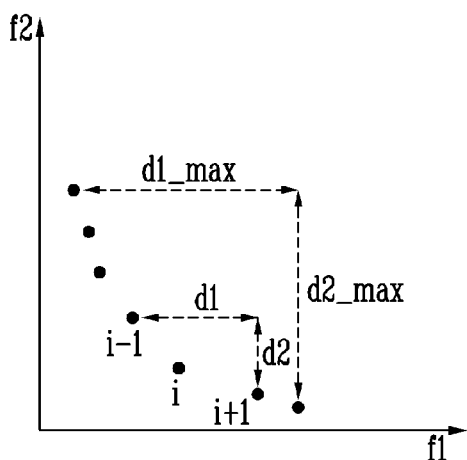
(2)

US 12,307,127 B2

STORAGE DEVICE AND HOST DEVICE FOR OPTIMIZING MODEL FOR CALCULATING DELAY TIME OF THE STORAGE DEVICE

CROSS-REFERENCE TO RELATED APPLICATION

This patent document is a divisional of, and claims the priority and benefits of, U.S. patent application Ser. No. 17/670,275, filed on Feb. 11, 2022, which claims the priority and benefits of the Korean patent application number 10-2021-0105625, filed on Aug. 10, 2021. The contents of the before-mentioned patent applications are incorporated herein by reference in their entireties as part of the disclosure of this document.

TECHNICAL FIELD

The present disclosure relates to an electronic device, and more particularly, to a storage device and a host device for optimizing a model or algorithm for calculating a delay time of the storage device.

BACKGROUND

A storage device is a device that stores data under control of a host device such as a computer or a smartphone. The storage device may include a memory device storing data and a memory controller controlling the memory device. The memory device may be classified into a volatile memory device and a nonvolatile memory device.

The volatile memory device may be a device that stores data only when power is supplied and loses the stored data when the power supply is cut off. The volatile memory device may include a static random access memory (SRAM), a dynamic random access memory (DRAM), and the like.

The nonvolatile memory device is a device that does not lose data even though power is cut off. The nonvolatile memory device includes a read only memory (ROM), a programmable ROM (PROM), an electrically programmable ROM (EPROM), an electrically erasable and programmable ROM (EEPROM), a flash memory, and the like.

SUMMARY

The disclosed technology can be implemented in some embodiments to provide a data storage device that can delay writing data for an optimized delay time.

In some embodiments of the disclosed technology, a host device can determine one or more coefficients of a model or algorithm for calculating a delay time applicable to a data storage device.

In some embodiments of the disclosed technology, a storage device may include a memory device for storing data, a buffer memory configured to temporarily store the data to be stored in the memory device, and a memory controller configured to determine a delay time based on a plurality of parameters upon receipt of a write request from a host, and transmit a data request to the host after the delay time has elapsed.

In some embodiments of the disclosed technology, a host device may include a communication interface configured to communicate with a storage device, and a processor configured to generate an offspring population from a population including individual groups respectively corresponding to parameters of a model for calculating a delay time to delay writing of data to the storage device using a genetic operator, select a preset number of individual group among the individual groups included in the population and the offspring population based on a non-dominant rank and a cluster distance, and controls the communication interface to transmit the selected individual group to the storage device.

In some embodiments of the disclosed technology, a storage device may include a memory device for storing data, a host interface configured to receive the data to be stored in the memory device from a host, a buffer memory configured to temporarily store the data received from the host, and a processor configured to determine a delay time based on a value obtained by multiplying a parameter corresponding to each of a plurality of factors of a delay model, upon receipt of a write request from the host through the host interface, and control the host interface to transmit a request of the data to the host after the delay time has elapsed. The processor may generate an offspring population including new factor groups from a population including factor groups including values corresponding to each of the plurality of factors using a genetic operator, select a preset number of factor group among the factor groups included in the population and the offspring population based on a non-dominant rank and a cluster distance, and determine values included in the selected factor group as the plurality of factors of the delay model.

In some embodiments of the disclosed technology, a storage device may include a memory device including a plurality of memory blocks for storing data, a buffer memory in communication with the memory device and configured to temporarily store data that is received by the storage device to be stored in the memory device, and a memory controller in communication with the memory device and the buffer memory and configured to: determine a delay time to delay writing of data to the buffer memory based on a plurality of parameters upon receipt of a write request from a host; and transmit a data request to the host after the delay time has elapsed.

In some embodiments of the disclosed technology, a host device may include a communication interface configured to enable the host device to communicate with a storage device, and a processor configured to generate an offspring population from a population including individual groups respectively corresponding to parameters of a model for calculating a delay time to delay writing of data to the storage device using a genetic operator, select a preset number of individual groups among the individual groups included in the population and the offspring population based on a non-dominant rank and a cluster distance, and controls the communication interface to transmit the selected individual group to the storage device.

In some embodiments of the disclosed technology, a storage device may include a memory device including a plurality of memory blocks for storing data, a host interface in communication with a host and configured to receive data to be stored in the memory device from the host, a buffer memory configured to temporarily store the data received from the host, and a processor configured to determine a delay time to delay writing of data to the buffer memory based on a value multiplied by a parameter corresponding to each of a plurality of factors of a delay model, upon receipt of a write request from the host through the host interface, and control the host interface to transmit a request for the data to the host after the delay time has elapsed, wherein the processor generates an offspring population including new factor groups from a population including factor groups including values corresponding to each of the plurality of factors using a genetic operator, selects a preset number of factor group among the factor groups included in the population and the offspring population based on a non-dominant rank and a cluster distance, and determines values included in the selected factor group as the plurality of factors of the delay model.

The disclosed technology can be implemented in some embodiments to provide a storage device that can calculate an optimized delay time, thereby improving performance of latency and throughput according to the optimized delay time.

The disclosed technology can also be implemented in some embodiments to provide a host device determining a coefficient of a model for calculating a delay time of a storage device.

BRIEF DESCRIPTION OF THE DRAWINGS

FIG. 10 is a diagram illustrating a coefficient and an objective function of a model for determining a delay time based on some embodiments of the disclosed technology.

FIG. 11 is a diagram illustrating a method of sorting an individual included in a group based on some embodiments of the disclosed technology.

DETAILED DESCRIPTION

Specific structural or functional descriptions of embodiments according to the concept which are disclosed in the present specification or application are illustrated only to describe the embodiments according to the concept of the present disclosure. The embodiments according to the concept of the present disclosure may be carried out in various forms and should not be construed as being limited to the embodiments described in the present specification or application.

Figure 1:
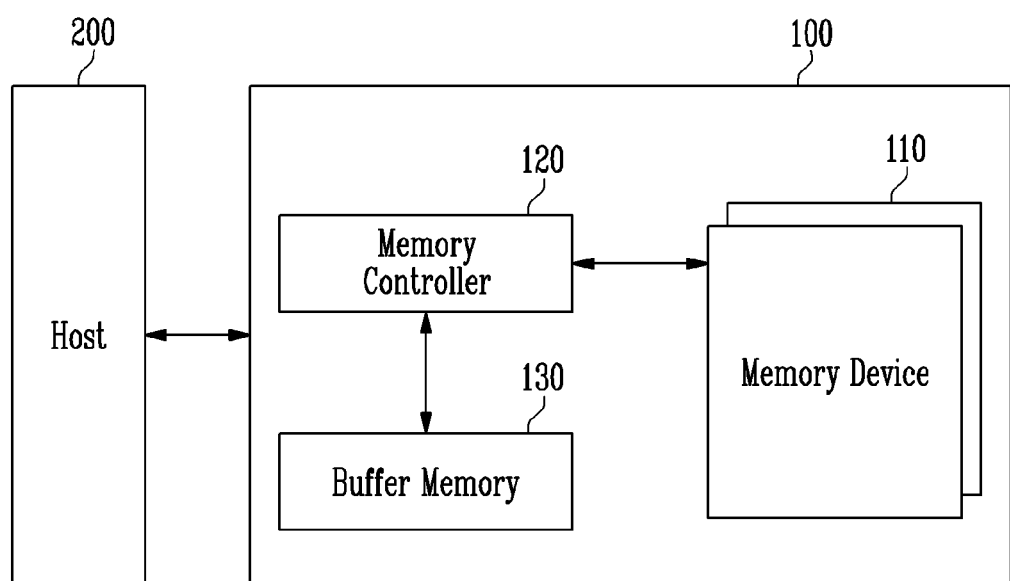
FIG. 1 is a diagram illustrating an example of a system based on some embodiments of the disclosed technology.

FIG. 1 is a diagram illustrating a system based on some embodiments of the disclosed technology.

Referring to FIG. 1, the system based on some embodiments of the disclosed technology may include a storage device 100 and a host device 200. In this patent document, the storage device 100 may include any type of data storage device that is configured to store data.

The storage device 100 may perform an operation corresponding to a request according to the request of the host device 200. For example, the storage device 100 may store data received from the host device 200. The storage device 100 may provide the stored data to the host device 200. The storage device 100 may erase the stored data. To this end, the storage device 100 may be connected to the host device 200 through various communication methods.

The storage device 100 may be classified into any one of various types of storage devices, such as a solid state disk (SSD), a multi-media card (MMC), an embedded MMC (eMMC), a reduced-size MMC (RS-MMC), a micro-MMC type card, an SD, a mini-SD, a micro-SD type secure digital card, a universal serial bus (USB) storage device, a universal flash storage (UFS) device, a personal computer memory card international association (PCMCIA) card type storage device, a peripheral component interconnection (PCI) card type storage device, a PCI express (PCI-E) card type storage device, a compact flash (CF) card, a smart media card, and a memory stick according to a communication method performed by the storage device 100 or a storage method of data.

The host device 200 may be one of various electronic devices such as a desktop computer, a laptop computer, a mobile phone, a smart phone, a game machine, a television (TV), a tablet computer, or a wearable device. In the present disclosure, the host device 200 may be a user's electronic device for storing data in the storage device 100 or reading data stored in the storage device 100. Alternatively, the host device 200 may be a test device that performs an operation for optimizing a model or algorithm applicable to the storage device 100. The host device 200 may be referred to as a host.

The storage device 100 may include a memory device 110, a memory controller 120, and a buffer memory 130. Here, the number of memory devices 110 may be one or plural.

The memory device 110 may include a plurality of memory blocks. Each of the plurality of memory blocks may include a plurality of pages. That is, one memory block may include the plurality of pages. Here, the page is a unit in which a program operation (or a write operation) of storing data is performed. In addition, the page is a unit in which a read operation of reading stored data is performed. The memory block is a unit in which an erase operation of erasing stored data is performed. Each of the plurality of pages may include a plurality of memory cells. Each of the plurality of memory cells may store a charge. A distribution state of a threshold voltage of each of the plurality of memory cells may vary according to an amount of stored charge. Here, the distribution state of the threshold voltage may indicate a value of data.

The memory controller 120 may control an overall operation of the storage device 100.

The memory controller 120 may control an operation of the memory device 110. For example, the memory controller 120 may control the memory device 110 to perform the program operation of storing data, the read operation of requesting stored data, or the erase operation of deleting stored data. Specifically, in a case of the program operation, the memory controller 120 may provide a program command, an address, and data to the memory device 110. In a case of the read operation, the memory controller 120 may provide a read command and an address to the memory device 110. In a case of the erase operation, the memory controller 120 may provide an erase command and an address to the memory device 110.

The buffer memory 130 may temporarily store data to be stored in the memory device 110. Specifically, when data is received by the storage device 100 from the host device 200, the storage device 100 may store the received data in the buffer memory 130 until the received data is transferred to and is written to the memory device 110. The storage device 100 may erase the data from the buffer memory 130 after the data is transferred to and written to the memory device 110.

Upon receipt of a write request and data that will be written to the memory device 110 (hereinafter referred to as "write data") from the host device 200, the memory controller 120 may store the write data in the buffer memory 130. In addition, the memory controller 120 may map a logical address received together with the write request from the host device 200 to a physical address. In addition, the memory controller 120 may transmit the program command, the mapping information (e.g., the physical address corresponding to the logical address), and the write data stored in the buffer memory 130 to the memory device 110 that includes a memory block corresponding to the physical address. In this case, the memory device 110 may perform a program operation to write the write data to the memory block corresponding to the physical address, based on the program command, write data, and physical address. Thereafter, when the program operation is completed, the memory device 110 may provide, to the memory controller 120, a message that indicates the program operations has been performed successfully (hereinafter referred to as "pass" or "pass information"). The memory controller 120 may identify the memory device 110 on which the program operations has been performed successfully based on the pass information. In addition, the memory controller 120 may erase the write data stored in the buffer memory 130 based on the pass information.

In general, the data rate for the data transmitted from the host device 200 to the storage device 100 during a specified time period is relatively larger than the data rate for the data that is written to the memory device 110 in the storage device 100. Accordingly, a bottleneck may occur because the storage device 100 is unable to accommodate large amounts of data at the data transmission rate of the host device 200. In such a case, the buffer memory 130 may be used to temporarily store data while it is being moved from the host device 200 to the memory device 110, thereby solving the bottleneck problem.

In some embodiments of the disclosed technology, upon receipt of the write request from the host device 200, the memory controller 120 may receive data corresponding to the write request of the host device 200 based on a use state of the buffer memory 130 because the buffer memory 130 cannot store the data if it does not have sufficient memory space available to receive the data. The use state of the buffer memory 130 may include a memory usage (e.g., memory usage rate) of the buffer memory 130. The data currently stored in the buffer memory 130 is data that had been stored in response to a previous write request from the host device 200 or another host. Upon receipt of the write request from the host device 200, the memory controller 120 may transmit a data request to the host device 200 after the buffer memory 130 is identified as available.

In some implementations, the memory controller 120 may determine a delay time based on the memory usage of the buffer memory 130. The memory controller 120 can delay the writing of data to the buffer memory 130 to avoid lack of memory resources. Thus, the memory controller 120 may request data corresponding to the write request to the host device 200 after delaying the writing of the data for the delay time. That is, the memory controller 120 may push back the point in time at which the memory controller 120 requests to receive the data corresponding to the write request from the host device 200. The delay time can be set to be long enough to prevent lack of memory resources. However, such a long delay time can decrease the memory throughput and increase the memory latency. When the delay time is short, the memory latency may be improved. However, when a free memory space for storing the write data in the buffer memory 130 is exhausted, the buffer memory 130 will need to make an empty space for storing the write data by performing additional operations, resulting in an increase in the memory latency. Accordingly, the memory controller 120 may manage usage of the buffer memory 130 through a model or algorithm for calculating the delay time using parameters related to the memory usage of the buffer memory 130. In addition, the host device 200 may select an optimized coefficient of the model for calculating the delay time and provide the optimized coefficient to the storage device 100. As another embodiment, the storage device 100 may select the optimized coefficient of the model for calculating the delay time by itself. In the context of this patent document, the words "optimized" or "optimal" that are used in conjunction with the coefficient of the model for calculating the delay time are used to indicate values or conditions that provide a better performance for the memory device (e.g., better memory throughput, shorter memory latency, etc.). In this sense, the words "optimized" or "optimal" may not always convey the best possible performance achievable by the data storage device.

The disclosed technology can be implemented in some embodiments to provide the storage device 100 that can calculate an optimized delay time, thereby improving the memory latency and the memory throughput according to the optimized delay time. In some implementations of the disclosed technology, the host device 200 determines the coefficient of the model for calculating the delay time of the storage device 100.

Figure 2:
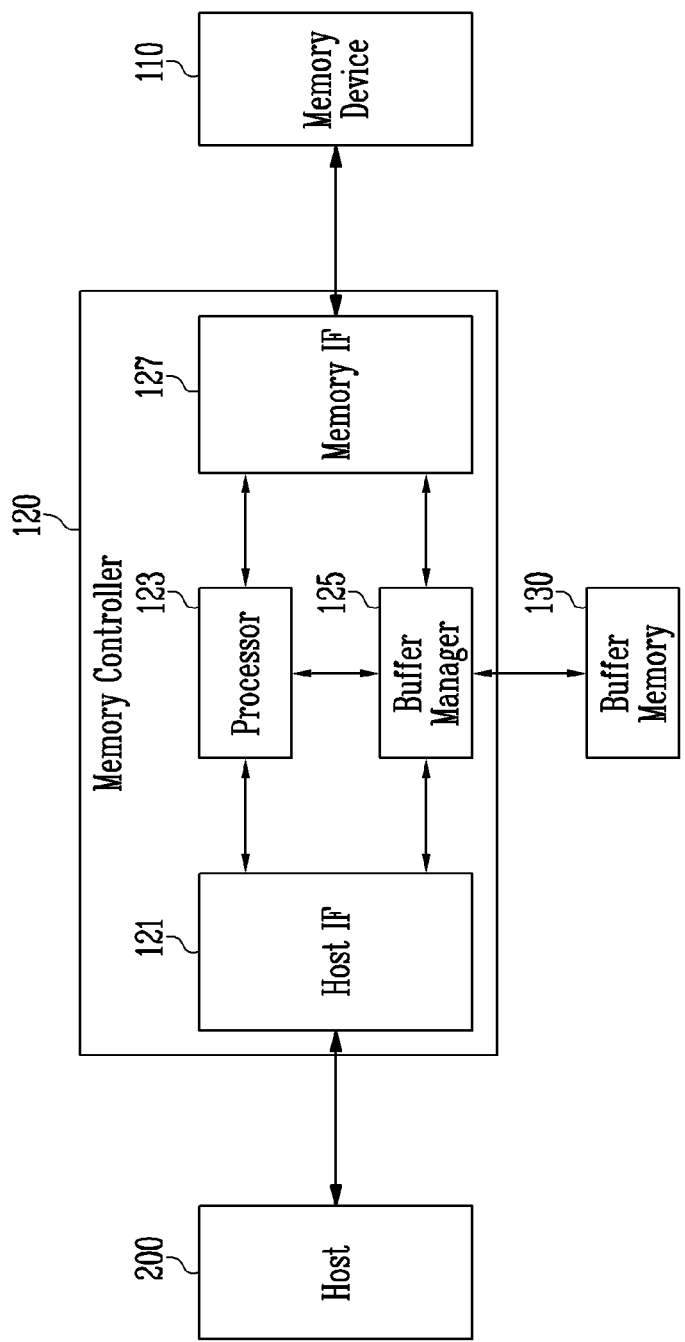
FIG. 2 is a diagram illustrating an example of a memory controller based on some embodiments of the disclosed technology.

FIG. 2 is a diagram illustrating a memory controller based on some embodiments of the disclosed technology.

Referring to FIG. 2, the memory controller 120 may include a host interface 121, a processor 123, a buffer manager 125, and a memory interface 127.

The host interface 121 may transmit and receive various data to and from the host device 200 through various communication methods. For example, the host interface 121 may be configured with at least one of various interfaces such as a universal serial bus (USB), a multimedia card (MMC), an embedded MMC (eMMC), a peripheral component interconnection (PCI), a PCI-express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), and a universal asynchronous receiver/transmitter (UART).

The host interface 121 may receive various requests from the host device 200. For example, the request may include a write request instructing to store data, a read request instructing to output the stored data, and a delete request instructing to delete the stored data. The host interface 121 may transmit the received request to the processor 123 or the buffer manager 125.

The host interface 121 may transmit a data request to the host device 200. In this case, the host interface 121 may receive data and a logical address from the host device 200. In addition, the host interface 121 may transmit the received data to the buffer memory 130. The host interface 121 may transmit the received logical address to the processor 123.

The processor 123 may control an overall operation of the memory controller 120. When power is applied to the storage device 100, the processor 123 may execute an instruction. The instruction may be, for example, firmware (FW) or the like. The firmware may include a host interface layer (HIL), a flash translation layer (FTL), and a flash interface layer (FIL). The host interface layer may control communication between the host device 200 and the host interface 121. That is, an operation of the host interface 121 may be controlled by a HIL. The FTL may map the logical address received from the host device 200 to the physical address of the memory device 110 and manage a mapping relationship between the logical address and the physical address. The FIL may control communication between the memory interface 127 and the memory device 110.

The buffer manager 125 may manage information associated with the buffer memory 130. Specifically, the buffer manager 125 may periodically monitor the usage of the buffer memory 130. For example, the buffer manager 125 may periodically request state information of the buffer memory 130 (e.g., used and unused memory spaces of the buffer memory 130) and receive the state information from the buffer memory 130. The buffer manager 125 may check the usage of the buffer memory 130 and whether the buffer memory 130 is available based on the state information received from the buffer memory 130.

To this end, the state information of the buffer memory 130 may include information on the usage of the buffer memory 130. For example, the state information of the buffer memory 130 may include information on the number or size of segments (e.g., buffer memory segments) in use among a plurality of segments included in a write buffer, and information on the number or size of empty segments. Here, the segment in use may be a segment that currently stores data, and the empty segment may be a segment that does not have any data stored. The empty segment may indicate an available segment.

The buffer manager 125 may determine the delay time based on a plurality of parameters. In some implementations, the parameters may include a variable related to the memory usage of the buffer memory 130. The memory controller 120 (or the host interface 121 in the memory controller 120) may delay the transmission of a data request to the host device 200 for the delay time.

In an embodiment, the plurality of parameters includes at least two of the usage of the buffer memory 130, an elapsed time from a time point when the write request is received from the host device 200 to a time point when the buffer memory 130 is confirmed to be in an available state, a queue depth, which indicates the number of requests received from the host device 200, and a change per unit time in the usage of the buffer memory 130.

In addition, the buffer manager 125 may control the host interface 121 to transmit the data request to the host device 200 after the delay time has elapsed. That is, the delay time may indicate a delay time from a time point when the buffer memory 130 is identified as the available state. Thereafter, the host interface 121 may transmit the data received from the host device 200 to the buffer memory 130, and the buffer memory 130 may store data in the empty segments of the write buffer.

In some implementations, the data stored in the segment of the buffer memory 130 may be transmitted to the memory device 110 through the memory interface 127. After the data is written to the memory device 110, the data stored in the segment may be deleted. For example, when the pass information for the data storage operation is received from the memory device 110 through the memory interface 127, the buffer manager 125 may delete the data stored in the corresponding segment in the buffer memory 130.

The memory interface 127 may transmit and receive data, commands, and other control signals between the memory controller 120 and the memory device 110. For example, the memory interface 127 may transmit the program command, the address, and the data stored in the buffer memory 130 to the memory device 110. In this case, the memory device 110 may store the data in a memory location (e.g., memory block, page, cell, etc.) corresponding to the address. As another example, the memory interface 127 may transmit the read command and the address to the memory device 110. In this case, the memory interface 127 may receive the data stored in a memory location corresponding to the address from the memory device 110. As another example, the memory interface 127 may transmit the erase command and the address to the memory device 110. In this case, the memory device 110 may delete the data stored in a position corresponding to the address. In some implementations, the operations of the memory interface 127 may be controlled by the FIL.

When the memory interface 127 transmits a request for the state information to the memory device 110, the memory interface 127 may receive the state information from the memory device 110. The state information may include pass/fail information that indicates an operation performed by the memory device 110 is successful ("pass") or unsuccessful ("fail") and ready/busy information that indicates a ready state or a busy state. The ready state may indicate that the memory device 110 does not currently perform any operation and is available for a new operation, and the busy state may indicate that the memory device 110 is currently performing an operation and is not available for a new operation.

The buffer memory 130 may temporarily store data to be written to the memory device 110. In an embodiment, the buffer memory 130 may include a write buffer that includes memory areas or spaces such as a plurality of segments configured to temporarily store data that will be written to the memory device 110. Each segment may store data up to a predetermined size. For example, the write buffer includes 512 segments, and each segment may store 4 kb of data.

To this end, the buffer memory 130 may include a static random access memory (SRAM) that can retain stored data without refresh operations as long as power is supplied, a dynamic RAM (DRAM) that requires refresh operations to retain stored data, or others.

In an embodiment, one area of the buffer memory 130 may be configured as an operation memory of the memory controller 120 and may also be used as a cache memory. In an embodiment, firmware may be stored in one area of the buffer memory 130. In some implementations. operations corresponding to the firmware stored in the buffer memory 130 may be performed by the processor 123. In other implementations, the memory controller 120 may further include at least one of an operation memory other than the buffer memory 130, a cache memory, and a separate memory for storing the firmware.

Figure 3:
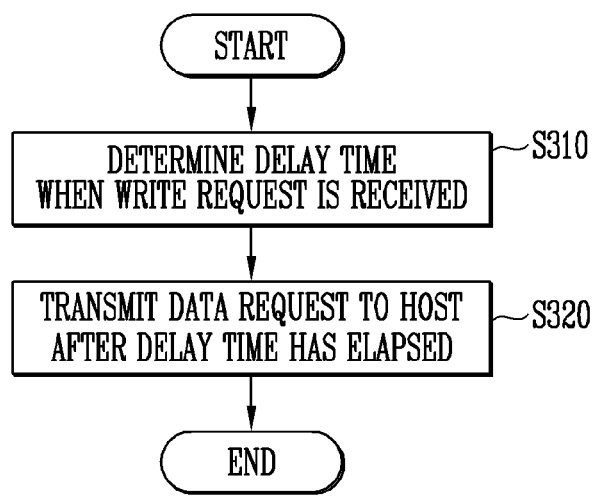
FIG. 3 is a diagram illustrating an example of a method of operating a storage device based on some embodiments of the disclosed technology.

FIG. 3 is a diagram illustrating a method of operating a storage device based on some embodiments of the disclosed technology.

Referring to FIG. 3, upon receipt of the write request from the host device 200, the memory controller 120 may determine the delay time based on the plurality of parameters (S310).

In an embodiment, upon receipt of the write request from the host device 200, the memory controller 120 may determine the delay time based on a sum of values obtained by multiplying a coefficient corresponding to each of the plurality of parameters. In one example, the coefficient corresponding to each of the parameters may be a fixed value. In another example, the coefficient corresponding to each of the parameters may be predetermined and stored in advance in the memory controller 120 or the buffer memory 130. Each of the parameters may be a variable value according to the memory usage of the buffer memory 130, and may be identified from the state information of the buffer memory 130.

In an embodiment, the plurality of parameters may include at least two of the usage of the buffer memory 130, an elapsed time from a time point when the write request is received from the host device 200 to a time point when the buffer memory 130 is confirmed to be in an available state, a queue depth, which indicates the number of requests received from the host device 200, and a change per unit time in the usage of the buffer memory 130. Hereinafter, for convenience of description, it is assumed that the plurality of parameters include the usage of the buffer memory 130 and the elapsed time.

In an embodiment, the coefficients may include values that are selected through a genetic algorithm (GA) in which latency and throughput are set as an objective function. Here, the genetic algorithm (GA) includes techniques for optimization using a calculation model based on an evolutionary algorithm that replicates the natural evolution process. For example, the genetic algorithm may be a nondominated sorting genetic algorithm (NSGA-II).

The latency or memory latency may indicate the time between a request of an operation (e.g., write operation or the read operation) and a completion of the operation. The throughput or memory throughput may indicate the rate at which data can be read from or stored into a memory device by a host. The objective function may indicate an objective or a target to be optimized through the genetic algorithm. That is, the objective function for the latency may quantitatively indicate fitness for the latency, and the objective function for the throughput may quantitatively indicate fitness for the throughput. It is assumed that the lower the value or fitness of the objective function, the better the performance of the memory device.

In an embodiment, the memory controller 120 may increase the delay time as the usage of the buffer memory 130 relatively increases. The memory controller 120 may decrease the delay time as the usage of the buffer memory 130 relatively decreases. That is, the coefficient corresponding to the usage of the buffer memory 130 may be a positive number.

In addition, the memory controller 120 may decrease the delay time as the elapsed time relatively increases. The memory controller 120 may increase the delay time as the elapsed time relatively decreases. That is, the coefficient corresponding to the elapsed time may be a negative number.

In addition, the memory controller 120 may transmit the data request to the host device 200 after the delay time has elapsed (S320).

Figures 4, 5:
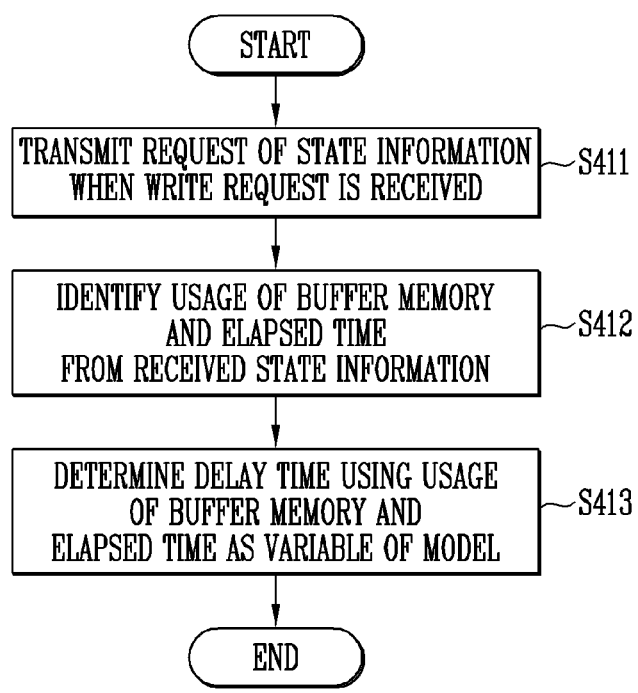
FIG. 4 is a diagram illustrating an example of a method of determining a delay time based on some embodiments of the disclosed technology.
FIG. 5 is a diagram illustrating an example of a model for determining a delay time based on some embodiments of the disclosed technology.

FIG. 4 is a diagram illustrating a method of determining a delay time based on some embodiments of the disclosed technology.

Referring to FIG. 4, upon receiving the write request from the host device 200, the memory controller 120 may transmit a request for the state information to the buffer memory 130 (S411). The memory controller 120 may receive the state information from the buffer memory 130. Here, the write request may include information on the data size corresponding to the write request.

The memory controller 120 may identify the usage of the buffer memory 130 and the elapsed time from the received state information (S412). The usage of the buffer memory 130 and the elapsed time may be the parameters of the model for calculating the delay time. The model for calculating the delay time may be referred to as a delay model. Here, the elapsed time may indicate a time from a time point when the write request is received to a time point when the buffer memory 130 is confirmed as the available state.

For example, the memory controller 120 may compare a data size of the data to be received from the host device 200 with an available size of the buffer memory 130. The available size of the buffer memory 130 may indicate a size of a free, open or empty memory space of the buffer memory 130 that is available to receive and store data from the host device 200. For example, the size of the free, open, or empty memory space of the buffer memory 130 may be a sum of free, open, or empty segments in the write buffer.

When the size of the data is greater than the available size of the buffer memory 130, the memory controller 120 may determine that the buffer memory 130 is in an unavailable state. The memory controller 120 may sends a request for the state information to the buffer memory 130 after a preset time has elapsed, and may receive the state information from the buffer memory 130. Thereafter, the memory controller 120 may compare the available size of the buffer memory 130 identified from the state information with the size of data. Depending on a comparison result, the above-described operation may be repeated again or an operation described below may be performed.

When the size of the data is less than or equal to the available size of the buffer memory 130, the memory controller 120 may determine that the buffer memory 130 is in the available state. In this case, the memory controller 120 may determine an elapsed time from a time point when the write request is received to a time point when it is determined that the buffer memory 130 is in an available state, as a variable or a parameter of the delay model. In addition, the memory controller 120 may determine the usage of the buffer memory 130 as the variable or the parameter of the delay model.

In addition, the memory controller 120 may determine the delay time using the usage of the buffer memory 130 and the elapsed time as the variable of the delay model (S413).

FIG. 5 is a diagram illustrating a model for determining a delay time based on some embodiments of the disclosed technology.

Referring to FIG. 5, the delay model based on some embodiments of the disclosed technology may be an equation for calculating a value based on the parameters and the coefficient corresponding to each of the parameters. FIG. 5 shows the delay model by way of example only, and the delay model may be modified and implemented in various forms.

For example, the parameters may include a usage ("buffer_usage") of the buffer memory 130 and an elapsed time ("elapsed_time"). Coefficients a1 and a2 corresponding to the usage ("buffer_usage") of the buffer memory 130 may be a factor multiplied by the usage ("buffer_usage") of the buffer memory 130. Coefficients a3, a4, and a5 corresponding to the elapsed time ("elapsed_time") may be a factor multiplied by the elapsed time ("elapsed_time"). A constant b1 may be a factor having a fixed value that is added regardless of the parameter.

Here, the coefficients a1 and a2 corresponding to the usage ("buffer_usage") of the buffer memory 130 may include the first coefficient a1 applied when the usage ("buffer_usage") of the buffer memory 130 is a value less than a boundary value n1 and the second coefficient a2 applied when the usage ("buffer_usage") of the buffer memory 130 is a value equal to or greater than the boundary value n1. For example, when the usage of the buffer memory 130 is expressed by the number of segments in use among the segments included in the write buffer, the boundary value n1 may be "400." As another example, when the usage of the buffer memory 130 is expressed by percentage, the boundary value n1 may be "60%."

The coefficients a3, a4, and a5 corresponding to the elapsed time ("elapsed_time") may include the first coefficient a3 applied when the elapsed time ("elapsed_time") is a value less than a first boundary value m1, the second coefficient a4 applied when the elapsed time ("elapsed_time") is a value equal to or greater than the first boundary value m1 and less than a second boundary value m2, and the third coefficient a5 applied when the elapsed time ("elapsed_time") is a value equal to or greater than the second boundary value m2. For example, the first boundary value m1 may be 300 μs, and the second boundary value m2 may be 600 μs.

As described above, the coefficient can vary depending on the section to which a value of the parameter belongs, and the boundary value of the section and the number of sections may be variously modified and implemented. The number of coefficients corresponding to the parameter may be equal to the number of sections.

Figure 6:
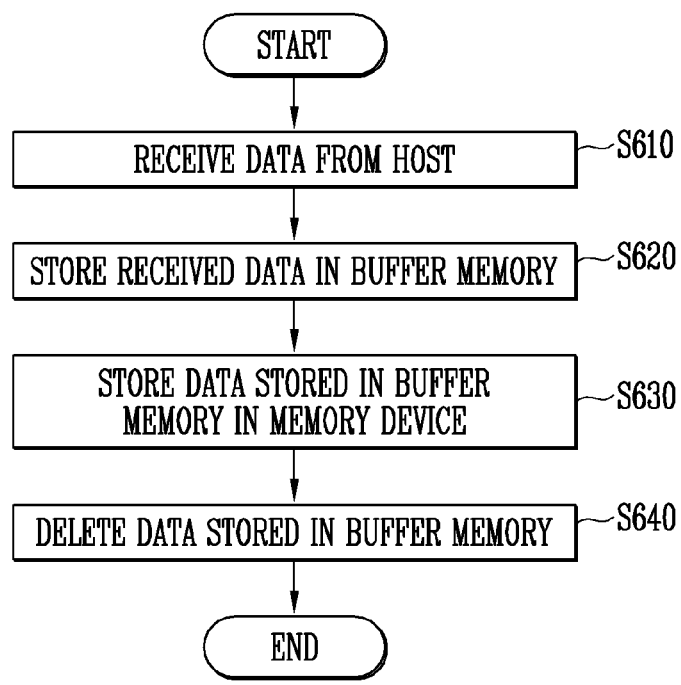
FIG. 6 is a diagram illustrating an example of a method of operating a storage device based on some embodiments of the disclosed technology.

FIG. 6 is a diagram illustrating a method of operating a storage device based on some embodiments of the disclosed technology.

Referring to FIG. 6, the memory controller 120 may receive data in response to the data request from the host device 200 (S610). In this case, the memory controller 120 may also receive the logical address for the data from the host device 200.

The memory controller 120 may store the data received from the host device 200 in the buffer memory 130 (S620). Here, the data received from the host device 200 may be temporarily stored in the buffer memory 130. The memory controller 120 may map the physical address of the memory device 110 to the received logical address.

The memory controller 120 may control the memory device 110 to store the data stored in the buffer memory 130 according to an operation state of the memory device 110 (S630). For example, the memory controller 120 may request the state information to the memory device 110 and receive the state information from the memory device 110. The state information may include the ready/busy information indicating the ready state or the busy state of the memory device 110. When it is confirmed that the memory device 110 is in the ready state from the state information received from the memory device 110, the memory controller 120 may transmit the program command, the physical address, and the data stored in the buffer memory 130 to the memory device 110.

When the pass information is received from the memory device 110, the memory controller 120 may control the buffer memory 130 to erase the data stored in the buffer memory 130 (S640). For example, the memory controller 120 may request the state information to the memory device 110 and receive the state information from the memory device 110. The state information may include the pass/fail information indicating the pass or the failure for an operation. When it is confirmed that an operation of storing the data in the memory device 110 is successful ("pass") based on the state information received from the memory device 110, the memory controller 120 may control the buffer memory 130 to erase the same data as the data stored in the memory device 110 from the buffer memory 130.

Figure 7:
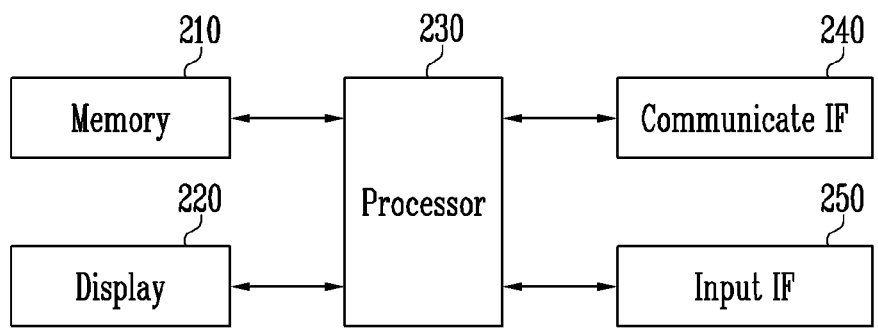
FIG. 7 is a diagram illustrating an example of a host device based on some embodiments of the disclosed technology.

FIG. 7 is a diagram illustrating a host device based on some embodiments of the disclosed technology.

Referring to FIG. 7, the host device 200 may include a processor 230 and a communication interface 240.

The processor 230 may control an overall operation of the host device 200. For example, the processor 230 may be implemented with a general-purpose processor such as a central processing unit (CPU) and an application processor (AP), a graphics dedicated processor such as a graphic processing unit (GPU), a vision processing unit (VPU), and an artificial intelligence dedicated processor such as a neural processing unit (NPU).

The communication interface 240 may communicate with the storage device 100. The communication interface 240 may transmit and receive various data to and from the storage device 100 through various communication methods. For example, the communication interface 240 may be configured with at least one of various interfaces such as a universal serial bus (USB), a multimedia card (MMC), an embedded MMC (eMMC), a peripheral component interconnection (PCI), a PCI-express (PCI-E), an advanced technology attachment (ATA), a serial-ATA, a parallel-ATA, a small computer system interface (SCSI), an enhanced small disk interface (ESDI), integrated drive electronics (IDE), Firewire, a universal flash storage (UFS), and a universal asynchronous receiver/transmitter (UART).

In an embodiment, the host device 200 may further include at least one of a memory 210, a display 220, and an input interface 250.

The memory 210 is a device for storing various information or data. Specifically, at least one instruction, module, or data required for an operation of the host device 200 may be stored in the memory 210. For example, the memory 210 may be implemented with at least one of a nonvolatile memory, a volatile memory, a flash memory, a hard disk drive (HDD) or a solid state drive (SSD), a RAM, and a ROM.

The display 220 is a device for displaying information or an image in a visual form. The display 220 may display the information or the image by outputting light having a specific color and contrast in an individual pixel unit. For example, the display 220 may display the information or the image in a method of a liquid crystal display (LCD) including a backlight, an organic light emitting diode (OLED) display, a micro LED display, a quantum dot LED (QLED) display, or the like.

The input interface 250 may receive various user inputs and transmit the various user inputs to the processor 230.

Here, the user input may be input of various methods, such as a user's touch input, a key input, a button input, and a user voice input. For example, the input interface 250 may include at least one of a touch panel, a keyboard, a mouse, and a microphone. For example, the touch panel may sense a user input through at least one of a capacitive type, a pressure sensitive type, an infrared method, and an ultrasonic method. The keyboard may sense the user input through a physical key or an optical key. A user's voice may be received through the microphone, and the user input may be sensed through voice recognition processing for the received voice.

The processor 230 may optimize the delay model of the storage device 100 through a genetic algorithm. That is, the processor 230 may select an optimized value for a coefficient multiplied by each of the parameters of the delay model.

In an embodiment, the parameters of the delay model may include at least two of the usage of the buffer memory 130, an elapsed time from a time point when the write request is received from the host device 200 to a time point when the buffer memory 130 is confirmed to be in the available state, a queue depth indicating the number of requests received from the host device 200, and a change per unit time in the usage of the buffer memory 130.

Figure 8:
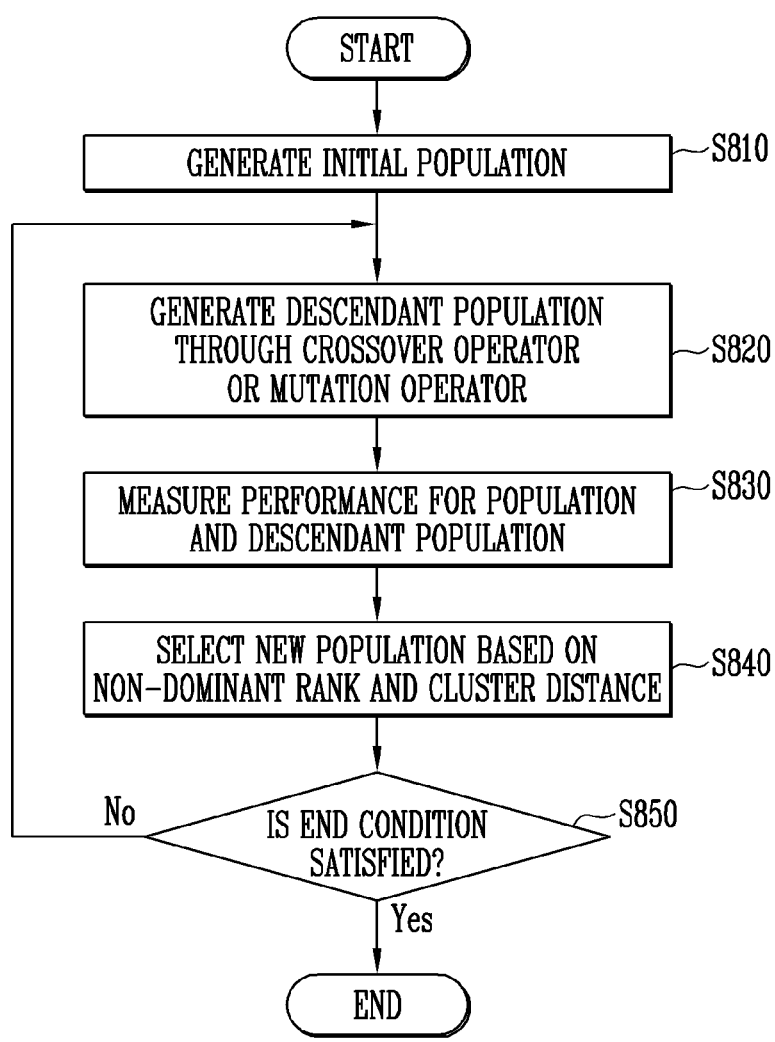
FIG. 8 is a diagram illustrating an example of a method of operating a host device based on some embodiments of the disclosed technology.
Figure 9:
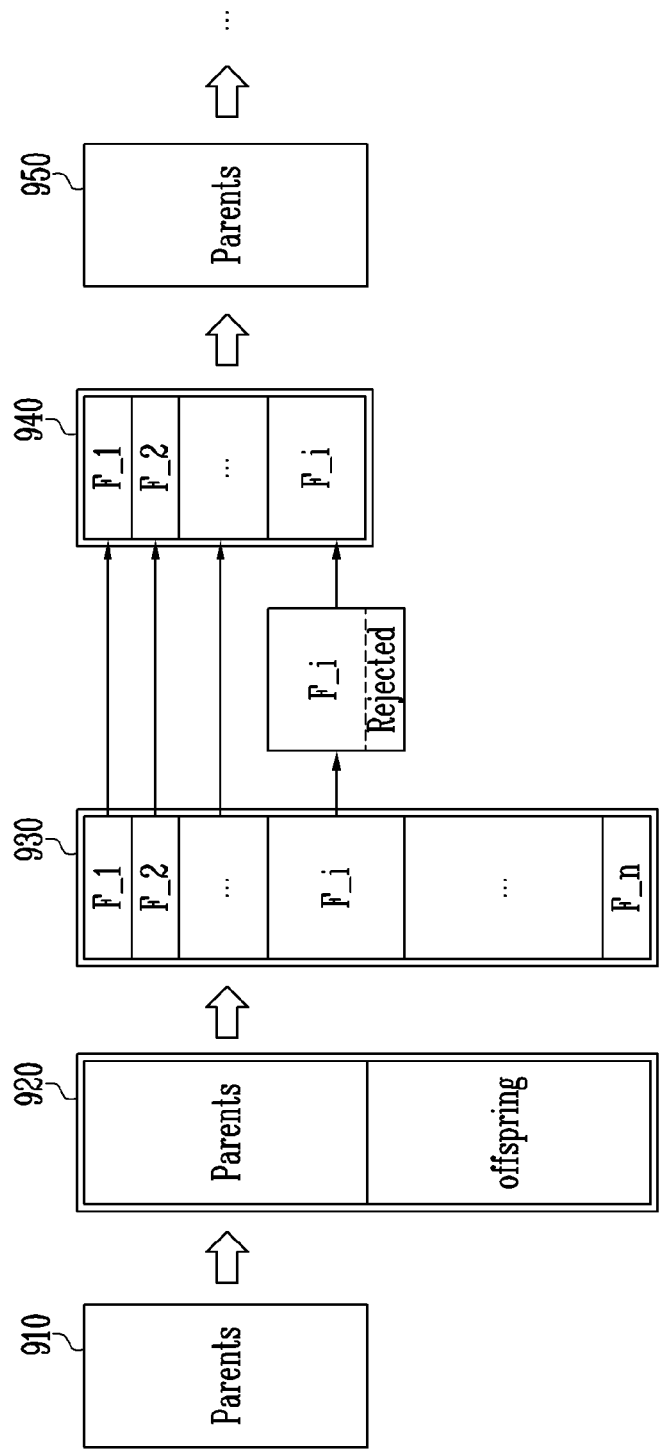
FIG. 9 is a diagram illustrating an example of a genetic algorithm that can be used to process parameters associated with a memory usage of a buffer memory based on some embodiments of the disclosed technology.

FIG. 8 is a diagram illustrating a method of operating a host device based on some embodiments of the disclosed technology. FIG. 9 is a diagram illustrating a genetic algorithm based on some embodiments of the disclosed technology.

Referring to FIGS. 8 and 9, the processor 230 of the host device 200 may generate an initial population 910 (S810). Here, the population may include one or more individual groups. Each individual group may include coefficients and constants of the delay model. Hereinafter, for convenience of description, the coefficients and the constants are referred to as factors. That is, each individual group may include a plurality of factors of the delay model. For example, referring to (1) of FIG. 10, a first individual group x1 may include a plurality of factors a11, a21, a31, a41, a51, and b11.

The initial population 910 indicates an initially generated population. The initial population 910 may include randomly generated individual groups. The number of individual groups may be preset. For example, the processor 230 may generate n individual groups including a plurality of factors having an arbitrary value. Here, the initial population 910 may include n individual groups, where n is a natural number.

In addition, the processor 230 may generate an offspring population from the initial population 910 using a genetic operator (S820). The offspring population may include the individual group generated using the individual group included in the initial population.

In an embodiment, the genetic operator may include at least one of a crossover operator and a mutation operator.

The crossover operator indicates an operator that generates a new individual group by intersecting any one individual group and another individual group included in the population. Here, those individual groups may be arbitrarily selected. For example, referring to (1) of FIG. 10, some factors a11, a21, and a31 among the plurality of factors a11, a21, a31, a41, a51, and b11 included in the first individual group x1 may be selected, some factors a42, a52, and b12 among a plurality of factors a12, a22, a32, a42, a52, and b12 included in a second individual group x2 may be selected, and the selected factors may be summed to generate the new individual group. When some factors are selected from the first individual group x1, remaining factors except for the factors corresponding to the factors selected from the first individual group x1 may be selected from the second individual group x2. Here, the new individual group may include a plurality of factors a11, a21, a31, a42, a52, and b12 intersected from the first individual group x1 and the second individual group x2.

The mutation operator indicates an operator that changes a factor of any one individual group included in the population to an arbitrary value according to a preset probability. For example, a fifth factor selected according to a probability among the plurality of factors a11, a21, a31, a41, a51, and b11 included in the first individual group x1 may be changed to a value of m51, which is an arbitrary value, to generate the new individual group. Here, the new individual group may include a plurality of factors a11, a21, a31, a41, m51, and b11.

In an embodiment, the processor 230 may generate an offspring population including the same number of individual groups as the number of individual groups included in the initial population. For example, when the number of individual groups included in the initial population is n, the processor 230 may generate an offspring population including n individual groups, where n is a natural number.

In addition, the processor 230 may measure performance of the initial population 910 and the offspring population (S830). Here, the performance may indicate storage performance of the storage device 100. In an embodiment, the storage performance may include latency indicating a time when storage of data (or the writing data) is completed and throughput (or input/output operations per second (IOPS)) indicating a storage speed of data. For example, the host device 200 may measure performance of each individual group through various benchmark tools such as a flexible I/O tester (FIO) and Iometer. In an embodiment, the latency may be a time from a time point when the host device 200 transmits a command for instructing storage of data to the storage device 100 to a time point when the host device 200 receives a message indicating that the storage of data is completed from the storage device 100. Alternatively, in an embodiment, the latency may be a time from a time point when the storage device 100 receives a command for instructing to store data from the host device 200 to a time point when the storage device 100 transmits the message indicating that the storage of data is completed to the host device 200.

For example, when the offspring population is generated from the initial population 910, the processor 230 may combine the initial population 910 and the offspring population. The processor 230 may measure performance of a sum population 920 in which the initial population 910 and the offspring population are summed. The sum population 920 may include individual groups included in the initial population 910 and individual groups included in the offspring population.

In addition, the processor 230 may select a new population 950 from the sum population 920 based on a non-dominant rank and a cluster distance (S840). The new population 950 may include some individual groups selected from among the individual groups included in the sum population 920.

In an embodiment, the processor 230 may select a preset number of individual groups from among the individual groups included in the initial population and the offspring population. In an embodiment, the preset number may be the same as the number of individual groups included in the initial population 910. In this case, operations S820 to S850 may be repeated until an end condition is satisfied, and the number of individual groups included in the new population 950 may be maintained to be the same even though the number of times is repeated. In another embodiment, the preset number may be less than the number of individual groups included in the initial population 910. In this case, the operations S820 to S850 may be repeated until the end condition is satisfied, and the number of individual groups included in the new population 950 may be decreased as the repeated number of times is increased.

In an embodiment, the processor 230 may select the individual groups included in the sum population 920 according to the non-dominant rank, and select some individual groups from among the selected individual groups according to the cluster distance as the new population 950. A more detailed description of the non-dominant rank and the cluster distance is described with reference to FIGS. 10 and 11.

FIG. 10 is a diagram illustrating a coefficient and an objective function of a model for determining a delay time based on some embodiments of the disclosed technology. FIG. 11 is a diagram illustrating a method of sorting an individual included in a group based on some embodiments of the disclosed technology.

In an embodiment, first, the delay model of FIG. 5 may be assumed. The parameters of the delay model of FIG. 5 may include the usage ("buffer_usage") of the buffer memory 130 and the elapsed time ("elapsed_time"). The factor of the delay model of FIG. 5 may include coefficients a1 and a2 multiplied by the usage ("buffer_usage") of the buffer memory 130, coefficients a3, a4, and a5 multiplied by the elapsed time ("elapsed_time") and constant b1. For example, referring to (1) of FIG. 10, the sum population 920 may include individual groups x1, x2, x3, . . . . Each of the individual groups x1, x2, x3, . . . may include a plurality of factors positioned in the same row.

The processor 230 may calculate an objective function for each of the individual groups included in the sum population 920. Specifically, the processor 230 may apply a plurality of factors included in the individual group to the delay model, and then indicate fitness for the measured performance as a value of the objective function. The objective function may indicate an objective or a target to be optimized through a genetic algorithm. For example, referring to (2) of FIG. 10, a first objective function f1 may be a quantitative indication of fitness of the latency for each of the individual groups x1, x2, x3, . . . , and a second objective function f2 may be a quantitative indication of fitness for the throughput. Hereinafter, it is assumed that a value of the objective function is set to be decreased as the performance is excellent, and it is assumed that the objective function is set to two.

In this case, according to the value of the objective function for each of the individual groups x1, x2, x3, . . . , each of the individual groups x1, x2, x3, . . . may be disposed on a virtual two-dimensional plane.

Referring to (1) of FIG. 11, on a plane in which the first objective function f1 is set as a value of an x-axis and the second objective function f2 is set as a value of a y-axis, each of the individual groups x1, x2, x3, . . . may be disposed according to values of the first objective function f1 and the second objective function f2. Here, the first individual group x1 may be disposed at a first point P(x1). Here, a position on the x-axis of the first point P(x1) may be the value of the first objective function f1 for the first individual group x1, and a position on the y-axis of the first point P(x1) may be the value of the second objective function f2 for the first individual group x1. In the method described above, the second individual group x2 may be disposed at a second point Q(x2).

The processor 230 may allocate a first non-dominant rank to individual groups having a relationship in which one of the fitness for the latency and the fitness for the throughput is greater and the other is less. That is, the processor 230 may select individual groups having a relationship in which one of the values of the first objective function f1 and the second objective function f2 is greater and the other is less among the individual groups x1, x2, x3, . . . , and allocate the first non-dominant rank to the selected individual groups.

The processor 230 may apply a second non-dominant rank to individual groups having a relationship in which one of the fitness for the latency and the fitness for the throughput is greater and the other is less among remaining individual groups except for the individual groups to which the first non-dominant rank is allocated. Here, the first non-dominant rank may indicate a priority higher than that of the second non-dominant rank.

For example, referring to (1) of FIG. 11, the value of the first objective function f1 of the first individual group x1 may be greater than the value of the first objective function f1 of the second individual group x2, and thus the first individual group x1 may indicate worse performance for the latency. However, the value of the second objective function f2 of the first individual group x1 may be less than the value of the second objective function f2 of the second individual group x2, and thus the first individual group x1 may indicate better performance for the throughput. That is, the first individual group x1 and the second individual group x2 may have a relationship in which it is difficult to evaluate superiority or inferiority of each other when considering the first objective function f1 and the second objective function f2 simultaneously, and such a relationship may be defined as a non-dominated relationship.

As another example, in a case of the points p1 and p2 for different individual groups, since both of the first objective function f1 and the second objective function f2 of the point p1 are less than both of the first objective function f1 and the second objective function f2 of the point p2, the point p1 indicate performance superior to that of the point p2. The point p1, which has excellent performance for all objective functions, may be defined as a relationship that dominates the point p2. In this case, a non-dominant rank having a priority higher than that of the point p2 may be allocated to the point p1. Here, it is assumed that a priority is high as the non-dominant rank is low.

Referring to FIG. 9, the individual groups included in the sum population 920 may be sorted according to non-dominant ranks F_1, F_2, . . . allocated to each of the individual groups. For example, the sum population 920 may be sorted like the group 930 of FIG. 9.

In an embodiment, the processor 230 may calculate a cluster distance for each of the individual groups having the same non-dominant rank included in the initial population and the offspring population. The cluster distance may be a numerical value of a distribution density of the individual groups. For example, when the processor 230 selects an i-th individual group of (2) of FIG. 11 from among individual groups having the first non-dominant rank of (1) of FIG. 11, the processor 230 may select an (i−1)-th individual group and an (i+1)-th individual group closest to the i-th individual group. Here, the distance may be calculated according to various algorithms, such as Euclidean distance, Karl Pearson distance, Manhattan distance, Minkowski distance, and Mahalnobis distance. In this case, the processor 230 may calculate a ratio of the area according to an x-axis distance d1 and a y-axis distance d2 between the (i−1)-th individual group and the (i+1)-th individual group and the area according to an x-axis maximum distance d1_max between the individual groups and according to a maximum y-axis distance d2_max as the cluster distance for the i-th individual group. Here, as the ratio for the i-th individual group is less, the i-th individual group may be dense with neighboring individual groups.

In an embodiment, the processor 230 may sequentially select individual groups having a high non-dominant rank from among the individual groups included in the sorted group 930 until the number of selected individual groups is equal to or greater than a preset number. For example, the preset number may be equal to or less than the number of individual groups included in the initial population 910.

In addition, the processor 230 may sequentially remove individual groups having a low cluster distance from among the last selected individual groups until the number of selected individual groups becomes equal to the preset number. This is to secure diversity of the individual group by selecting the individual groups having a high cluster distance as the individual groups to be included in the new population. Alternatively, the processor 230 may sequentially remove individual groups having a high cluster distance from among the last selected individual groups until the number of selected individual groups becomes equal to the preset number.

For example, it may be assumed that the number of individual groups included in the sorted group 930 is 200 and the preset number is 100. In addition, when it may be assumed that the number of individual groups having first to (i−1)-th non-dominant ranks is 180 and the number of individual groups having an i-th non-dominant rank is 50, the processor 230 may sequentially select individual groups having a higher non-dominant rank from among the individual groups included in the sorted group 930 to select individuals having the first to i-th non-dominant ranks. In this case, the processor 230 may remove 30 individual groups in a descending order of the cluster distance from among the last selected individual groups having the i-th non-dominant rank.

In addition, the processor 230 may select the finally selected individual groups as a new group 940. The new group 940 may include the finally selected individual groups. Here, the new group 940 may serve as the new population 950.

Referring to FIG. 8 again, the processor 230 may determine whether the end condition is satisfied (S850). That is, when an end event occurs, the processor 230 may determine that the end condition is satisfied.

Here, the end event may include an event in which the number of times a new offspring population is generated reaches a reference value. That is, the number of times in which the operations S820 to S850 are performed may be the same as the reference value.

In an embodiment, when the end condition is not satisfied (S850, No), the processor 230 may perform the operations S820 to S850 again. That is, when the end event does not occur (S850, No), the processor 230 may generate a new offspring population from the new population 950 using the genetic operator. In addition, the processor 230 may measure the performance of the new population 950 and the new offspring population. In addition, the processor 230 may select the new population from among the individual groups included in the new population and the new offspring population, based on the non-dominant rank and the cluster distance. In addition, the processor 230 may determine whether the end condition is satisfied.

In an embodiment, when the end condition is satisfied (S850, Yes), the processor 230 may control the communication interface 240 to transmit the new population to the storage device 100. That is, when the end event occurs (S850, Yes), the processor 230 may control the communication interface 240 to transmit the individual group selected as the new population to the storage device 100. Here, the individual group selected as the new population may be the last selected individual group. Meanwhile, the number of transmitted individual groups may be at least one. In an embodiment, the individual group transmitted to the storage device 100 may include a positive coefficient corresponding to the usage of the buffer memory 130 and a negative coefficient corresponding to the elapsed time.

Figure 12:
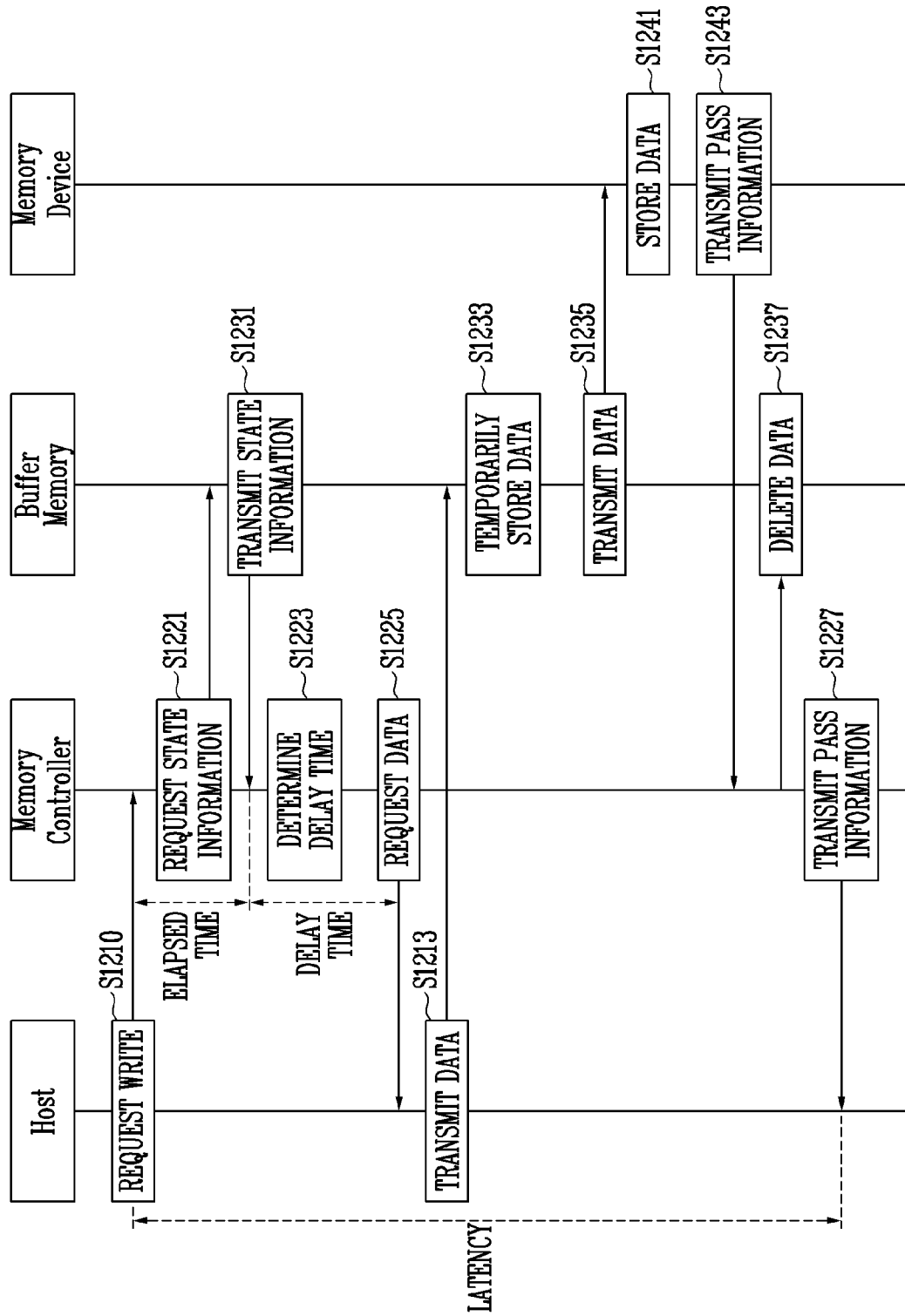
FIG. 12 is a diagram illustrating an operation of devices based on some embodiments of the disclosed technology.

FIG. 12 is a diagram illustrating an operation of devices based on some embodiments of the disclosed technology.

Referring to FIG. 12, the host device 200 may transmit the write request for data to the storage device 100 through the communication interface 240 (S1210).

When the write request is received through the host interface 121, the memory controller 120 may request the state information related to the memory usage of the buffer memory 130 to the buffer memory 130 (S1221).

In response to this, the memory controller 120 may receive the state information from the buffer memory 130 (S1231). The memory controller 120 may identify the parameter related to the state of the buffer memory 130 from the state information of the buffer memory 130. For example, the parameter may include the usage of the buffer memory 130 and the elapsed time.

The memory controller 120 may determine the delay time based on the parameters (S1223). For example, the memory controller 120 may calculate the delay time using the delay model and the parameter to which the factors included in the individual group are applied. To this end, before step S1210, the host device 200 may transmit at least one individual group to the memory controller 120. That is, the memory controller 120 may receive at least one individual group from the host device 200.

After the delay time has elapsed, the memory controller 120 may transmit the request for data to the host device 200 through the host interface 121 (S1225). In response to this, the memory controller 120 may receive the data from the host device 200 through the host interface 121 (S1213).

The memory controller 120 may temporarily store the received data in the buffer memory 130 (S1233) and control the memory interface 127 to transmit the temporarily stored test data to the memory device 110 (S1235). The memory device 110 may store the received data therein (S1241).

When the pass information indicating the storage completion of data is received from the memory device 110 (S1243), the memory controller 120 may control the buffer memory 130 to delete the data temporarily stored in the buffer memory 130 (S1237).

In addition, when the pass information indicating the storage completion of data is received from the memory device 110 (S1243), the memory controller 120 may transmit the pass information (or storage completion information) indicating the storage completion of data to the host device 200. In addition, the host device 200 may determine the time between a time point when the write request is transmitted (S1210) and a time point when the pass information is received (S1227) as the latency.

In some embodiments of the disclosed technology, the storage device 100 may select an optimized factor of the delay model for calculating the delay time by itself. The delay model may include a plurality of parameters and a plurality of factors. The plurality of factors may include a coefficient multiplied by each of the plurality of parameters. In addition, the plurality of factors may include a constant unrelated to the parameter. The delay model may be a model that calculates the delay time through a sum of a constant and values obtained by multiplying the parameter and the corresponding coefficient.

In an embodiment, the plurality of parameters may include at least two of the usage of the buffer memory 130, an elapsed time from a time point when the write request is received from the host device 200 to a time point when the buffer memory 130 is confirmed to be in the available state, a queue depth indicating the number of requests received from the host device 200, and a change per unit time in the usage of the buffer memory 130.

Specifically, the processor 123 of the storage device 100 may select the factor of the delay model through the genetic algorithm.

Referring to FIGS. 8 and 9, the processor 123 may generate the initial population 910 (S810). Here, the initial population 910 may indicate an initially generated population. The population may include one or more individual groups. Each individual group may include the factors of the delay model. For example, the first individual group x1 may include the plurality of factors a11, a21, a31, a41, a51, and b11. The factors of each individual group included in the initial population 910 may be randomly generated.

In addition, the processor 123 may generate the offspring population from the initial population 910 using the genetic operator (S820). Here, the genetic operator may include at least one of the crossover operator and the mutation operator. The offspring population may include at least one individual group generated from at least one individual group included in the initial population 910 using the genetic operator. The number of individual groups included in the offspring population may be equal to the number of individual groups included in the initial population 910.

In addition, the processor 123 may measure the performance of the sum population 920 including the initial population 910 and the offspring population (S830). The processor 123 may measure the performance of each of the plurality of individual groups included in the sum population 920. Here, the performance may include the first performance and the second performance. For example, the first performance may be the latency, and the second performance may be the throughput (or the IOPS).

For example, when the write request is received from the host, the processor 123 may calculate the delay time by applying the factors included in any one individual group included in the sum population 920 as the factors of the delay model, and control the host interface 121 to transmit the data request to the host device 200 after the delay time has elapsed. The processor 123 may store the data received from the host device 200 in the buffer memory 130. Thereafter, when an operation state of the memory device 110 is the ready state, the processor 123 may control the memory device 110 to store the data stored in the buffer memory 130 in the memory device 110. Thereafter, when the storage of data (or the writing data) in the memory device 110 is completed, the processor 123 may control the host interface 121 to transmit the message indicating that the data storage according to the write request is completed to the host device 200. In an embodiment, the latency may be a time from a time point when the memory controller 120 receives the write request from the host device 200 to a time point when the memory controller 120 transmits the message indicating that the storage of data is complete to the host device 200. In an embodiment, the latency may be a time from a time point when the memory controller 120 receives the write request from the host device 200 to a time point when the memory controller 120 receives the message indicating that the storage of data is complete from the memory device 110. The throughput may be an amount of data transmitted from the host device 200 to the storage device 100 per unit time.

In addition, the processor 123 may calculate the objective function for each of the plurality of individual groups included in the sum population 920. Taking any one individual group included in the sum population 920 as an example, the processor 123 may calculate the first objective function based on the first performance for any one individual group, and calculate the second objective function based on the second performance. As the values of the first and second objective functions decrease, the first and second performances may become excellent. However, this is only an embodiment, and may be modified and implemented to indicate that as the value of the objective function increases, the performance becomes excellent.

In addition, the processor 123 may select the new population 950 from the sum population 920 based on the non-dominant rank and the cluster distance (S840). The new population 950 may include some individual groups selected from among the individual groups included in the sum population 920.

In an embodiment, the processor 123 may allocate the non-dominant rank to the plurality of individual groups included in the sum population 920 according to the values of the first and second objective functions.

For example, the processor 123 may select any one individual group from among the plurality of individual groups included in the sum population 920, and may allocate the first non-dominant rank to the selected individual group when any one individual group that simultaneously satisfies a condition having the value of the first objective function less than the value of the first objective function of the individual group selected from among the plurality of individual groups, and a condition having the value of the second objective function less than the value of the second objective function of the selected one individual group does not exist. The processor 123 may allocate the first non-dominant rank to some individual groups among the plurality of individual groups by repeating the above operation. After allocating all of the first non-dominant ranks, the processor 123 may select any one individual group from among remaining individual groups except for the individual groups to which the first non-dominant rank is allocated, and allocate the second non-dominant rank to the selected individual group when any one individual group that simultaneously satisfies a condition having the value of the first objective function less than the value of the first objective function of the individual group selected from among the remaining individual groups, and a condition having the value of the second objective function less than the value of the second objective function of the selected one individual group does not exist. Here, the first non-dominant rank may indicate a priority higher than that of the second non-dominant rank.

In this case, the processor 123 may select the individual groups from among the plurality of individual groups included in the sum population 920 in an order in which the non-dominant rank increases, and include the selected individual groups in the new population 950.

In an embodiment, the processor 123 may sequentially select individual groups having a high non-dominance rank from among the individual groups included in the group 930 sorted according to the non-dominance rank. For example, the processor 123 may first select individual groups to which the non-dominant rank indicating the highest priority is allocated, and when the number of selected individual groups is equal to or less than a preset number, the processor 123 may select the individual groups to which the non-dominant rank indicating a next high priority is allocated.

In addition, when the number of selected individual groups is equal to the preset number, the processor 123 may generate the new population 950 including the selected individual groups. Alternatively, when the number of selected individual groups exceeds the preset number, the processor 123 may remove the individual groups according to the cluster distance among the individual groups having the last selected non-dominant rank until the number of selected individual groups is equal to the preset number. For example, the processor 123 may exclude the individual groups to be included in the new population 950 from the individual groups in an order in which the cluster distance decreases. As another example, the processor 123 may exclude the individual groups to be included in the new population 950 from the individual groups in an order in which the cluster distance increases. Here, the cluster distance may quantitatively indicate the distribution density of the individual groups, and may be calculated using the distance between the individual groups arranged on a two-dimensional plane according to the values of the first objective function and the second objective function.

The processor 123 may determine whether the end condition is satisfied (S850). When the end condition is not satisfied (S850, No), the processor 123 may perform the operations S820 to S850 again. When the end condition is satisfied (S850, Yes), the processor 123 may set factors included in the new population 950 as the factors of the delay model. That is, the processor 123 may store the factors included in the new population 950 in the internal or buffer memory 130 of the memory controller 120.

Figure 13:
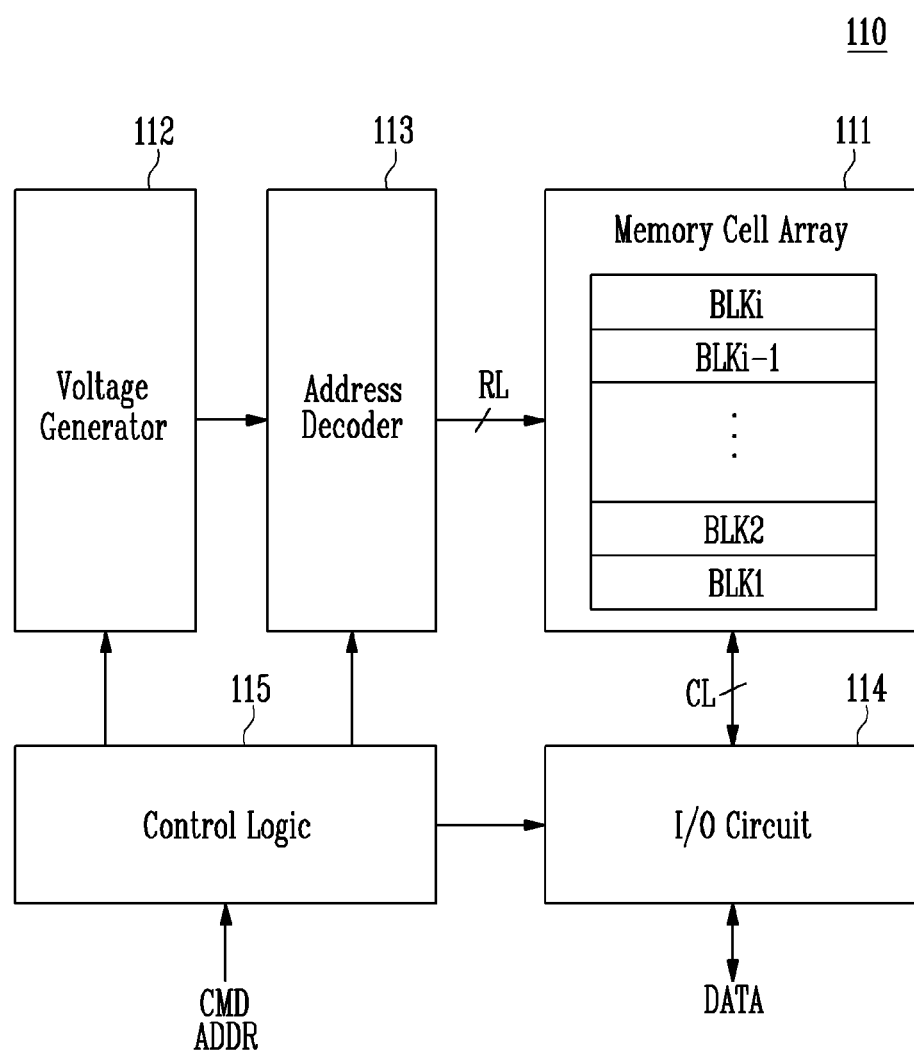
FIG. 13 is a diagram illustrating a memory device based on some embodiments of the disclosed technology.

FIG. 13 is a diagram illustrating a memory device based on some embodiments of the disclosed technology.

Referring to FIG. 13, the memory device 110 may include a memory cell array 111, a voltage generator 112, an address decoder 113, an input/output circuit 114, and a control logic 115.

The memory cell array 111 may include a plurality of memory blocks BLK1 to BLKi. The plurality of memory blocks BLK1 to BLKi may be connected to the address decoder 113 through row lines RL. The plurality of memory blocks BLK1 to BLKi may be connected to the input/output circuit 114 through column lines CL. In an embodiment, the row lines RL may include word lines, source select lines, and drain select lines. In an embodiment, the column lines CL may include bit lines.

Each of the plurality of memory blocks BLK1 to BLKi may include a plurality of memory cells.

Data may be stored in each of the plurality of memory cells. For example, each of the plurality of memory cells may store data of different number of bits according to a single level cell (SLC) method that stores one bit, a multiple level cell (MLC) method that stores two bits, a triple level cell (TLC) method that stores three bits, a quad level cell (QLC) method capable of storing four bits, or the like. Here, among the plurality of memory cells, memory cells connected to the same word line may be defined as one page.

In an embodiment, each of the plurality of memory cells may be a nonvolatile memory cell. For example, each of the plurality of memory cells may include a floating gate in which a charge may be accumulated. Each of the plurality of memory cells may indicate a specific value of data according to an amount of charge accumulated in the floating gate.

In an embodiment, the voltage generator 112, the address decoder 113, and the input/output circuit 114 may be collectively referred to as a peripheral circuit. The peripheral circuit may drive the memory cell array 111 under control of the control logic 115. The peripheral circuit may drive the memory cell array 111 to perform a program operation, a read operation, and an erase operation.

The voltage generator 112 may be configured to generate a plurality of operation voltages using an external power voltage supplied to the memory device 110. The voltage generator 112 may operate in response to the control of the control logic 115.

As an embodiment, the voltage generator 112 may generate an internal power voltage by regulating the external power voltage. The internal power voltage generated by the voltage generator 112 may be used as the operation voltage of the memory device 110.

As an embodiment, the voltage generator 112 may generate at least one operation voltage using an input voltage Vcc provided from an external power source. The voltage generator 112 may be configured to generate various voltages required by the memory device 110. For example, the voltage generator 112 may generate a plurality of erase voltages, a plurality of program voltages, a plurality of read voltages, and a plurality of pass voltages. To this end, the voltage generator 112 may include a plurality of pumping capacitors that receive the internal power voltage. The voltage generator 112 may generate a plurality of operation voltages by selectively activating the plurality of pumping capacitors in response to the control of the control logic 115.

The plurality of operation voltages generated by the voltage generator 112 may be supplied to the memory cell array 111 by the address decoder 113.

The address decoder 113 may be connected to the memory cell array 111 through the row lines RL. The address decoder 113 may be configured to operate in response to the control of the control logic 115. The address decoder 113 may receive an address ADDR from the control logic 115. The address decoder 113 may decode a block address among the received addresses ADDR. The address decoder 113 may select at least one memory block from among the memory blocks BLK1 to BLKi according to a decoded block address. The address decoder 113 may decode a row address among the received addresses ADDR. The address decoder 113 may select at least one word line from among the word lines of the selected memory block according to the decoded row address. In an embodiment, the address decoder 113 may decode a column address among the received addresses ADDR. The address decoder 113 may connect the input/output circuit 114 and the memory cell array 111 according to the decoded column address.

For example, the address decoder 113 may include components such as a row decoder, a column decoder, and an address buffer.

The input/output circuit 114 may include a plurality of page buffers. The plurality of page buffers may be connected to the memory cell array 111 through the bit lines. During a program operation, data stored in the plurality of page buffers may be provided to a selected page through the bit lines, and the provided data may be stored in the memory cells included in the selected page. During a read operation, the data stored in the memory cells included in the selected page may be sensed through the bit lines, and the sensed data may be stored in the page buffers.

The control logic 115 may control the address decoder 113, the voltage generator 112, and the input/output circuit 114. The control logic 115 may operate in response to a command CMD transmitted from an external device. The control logic 115 may generate control signals in response to the command CMD and the address ADDR and transmit corresponding control signals to the voltage generator 112, the address decoder 113, and the input/output circuit 114.

Although a number of illustrative embodiments have been described, it should be understood that various modifications or enhancements to the disclosed embodiments and other embodiments can be devised based on what is described and/or illustrated in this patent document.

What is claimed is:

1. A storage device comprising:
a memory device for storing data;
a buffer memory configured to temporarily store the data that is received by the storage device to be stored in the memory device; and
a memory controller configured to:
determine a delay time based on a sum of values obtained by multiplying a coefficient corresponding to each of a plurality of parameters upon receipt of a write request from a host, and
transmit a data request to the host after the delay time has elapsed.

2. The storage device of claim 1, wherein the coefficients include values selected through a genetic algorithm in which a latency between a request of an operation to write data and a completion of the operation, and a throughput including a rate at which data is written to the memory device are set as an objective function.

3. The storage device of claim 1, wherein the plurality of parameters includes usage of the buffer memory and an elapsed time from a time point when the write request is received from the host to a time point when the buffer memory is confirmed to be available, and
upon receipt of the write request from the host, the memory controller transmits a request for state information indicating a memory usage of the buffer memory to the buffer memory, and identifies the usage of the buffer memory and the elapsed time from the state information received from the buffer memory.

4. The storage device of claim 3, wherein the memory controller increases the delay time as the usage of the buffer memory increases, and decreases the delay time as the elapsed time increases.

5. The storage device of claim 1, wherein the plurality of parameters include at least two of usage of the buffer memory, an elapsed time from a time point when the write request is received from the host to a time point when the buffer memory is confirmed to be available, a queue depth indicating the number of requests received from the host, and a change per unit time in the usage of the buffer memory.

6. The storage device of claim 1, wherein the memory controller controls the buffer memory to store data received in response to the data request from the host, controls the memory device to store data stored in the buffer memory according to an operation state of the memory device, and controls the buffer memory to erase the data stored in the buffer memory upon receipt of pass information from the memory device.

* * * * *